(12) United States Patent
Parker et al.

(10) Patent No.: US 8,680,694 B2
(45) Date of Patent: Mar. 25, 2014

(54) VIBRATION ENERGY HARVESTER FOR CONVERTING MECHANICAL VIBRATIONAL ENERGY INTO ELECTRICAL ENERGY

(75) Inventors: John Stuart Parker, North Boarhunt (GB); Stephen Roberts, Winchester (GB)

(73) Assignee: Perpetuum Ltd., Southampton, Hampshire (GB)

( * ) Notice: Subject to any disclaimer, the term of this patent is extended or adjusted under 35 U.S.C. 154(b) by 987 days.

(21) Appl. No.: 12/622,858

(22) Filed: Nov. 20, 2009

(65) Prior Publication Data

US 2011/0115222 A1  May 19, 2011

(30) Foreign Application Priority Data

Nov. 19, 2009 (GB) .................................... 092025.9

(51) Int. Cl.
*F02B 63/04* (2006.01)
*H01L 41/00* (2013.01)

(52) U.S. Cl.
USPC .......................................... 290/1 R; 310/339

(58) Field of Classification Search
USPC ................. 290/1 R; 310/339, 329, 21, 29, 15
See application file for complete search history.

(56) References Cited

U.S. PATENT DOCUMENTS

| | | | |
|---|---|---|---|
| 4,642,547 A * | 2/1987 | Redlich | 322/3 |
| 4,829,239 A * | 5/1989 | Holstein et al. | 324/117 H |
| 6,028,755 A | 2/2000 | Saeki et al. | |
| 7,345,372 B2 * | 3/2008 | Roberts et al. | 290/1 R |
| 7,560,913 B2 * | 7/2009 | Petrowsky et al. | 323/266 |
| 7,999,402 B2 * | 8/2011 | Freeland et al. | 290/1 R |
| 8,188,622 B1 * | 5/2012 | Waters et al. | 310/15 |
| 2002/0175594 A1 | 11/2002 | Kornbluh et al. | |
| 2003/0067245 A1 | 4/2003 | Pelrine et al. | |
| 2006/0188269 A1 * | 8/2006 | Seong et al. | 398/202 |
| 2007/0194634 A1 * | 8/2007 | Roberts | 310/15 |
| 2007/0194759 A1 * | 8/2007 | Shimizu et al. | 320/166 |
| 2008/0129261 A1 | 6/2008 | Oelmaier | |
| 2008/0149167 A1 | 6/2008 | Liu | |
| 2009/0020517 A1 * | 1/2009 | Ito et al. | 219/210 |
| 2010/0164463 A1 * | 7/2010 | Kojima | 323/298 |
| 2010/0277137 A1 * | 11/2010 | Zhao et al. | 322/99 |
| 2012/0212097 A1 * | 8/2012 | Wasenczuk et al. | 310/216.001 |

FOREIGN PATENT DOCUMENTS

| | | |
|---|---|---|
| EP | 1821386 | 8/2007 |
| JP | 07087669 | 3/1995 |

* cited by examiner

*Primary Examiner* — Julio Cesar Gonzalez
(74) *Attorney, Agent, or Firm* — Shaukat A. Karjeker; Colin P. Cahoon; Carstens & Cahoon, LLP

(57) ABSTRACT

A vibration energy harvester for converting mechanical vibrational energy into electrical energy, the vibration energy harvester comprising a device for generating electrical energy when subjected to mechanical vibration, and a current control circuit electrically connected to the device for providing a substantially constant output current at an electrical output of the vibration energy harvester.

11 Claims, 4 Drawing Sheets

VIBRATION ENERGY HARVESTER FOR CONVERTING MECHANICAL VIBRATIONAL ENERGY INTO ELECTRICAL ENERGY

BACKGROUND TO THE INVENTION

The present invention relates to a vibration energy harvester for converting mechanical vibrational energy into electrical energy. The present invention also relates to a method of operating a vibration energy harvester for converting mechanical vibrational energy into electrical energy, including during an installation phase. In particular, the present invention relates to such a device which is a miniature generator capable of converting ambient vibration energy into electrical energy for use, for example, in powering intelligent sensor systems. Such a system can be used in many areas where there is an economical or operational advantage in the elimination of power cables or batteries.

DESCRIPTION OF THE PRIOR ART

Vibration energy harvesters (VEH) are well known in the art and consist of mechanical resonators with either electromagnetic induction or piezo-electric power transduction. In either case the mechanical resonator consists of a sprung mass.

It is known to use a vibration energy harvester, for example an electromechanical generator, for harvesting useful electrical power from ambient vibrations, e.g. for powering wireless sensors.

A typical electromechanical generator is a magnet-coil generator which consists of a mechanical spring-mass combination attached to a magnet or coil in such a manner that when the system vibrates, a coil cuts through the flux formed by a magnetic core. Vibration energy harvesters should have either a fixed natural (resonant) frequency or a bandwidth which is made large enough to cope with any changes in this frequency as operating temperature changes.

During installation of a vibration energy harvester on a prospective vibration source, it would be advantageous to have some way of measuring the VEH current output so that different prospective mounting positions on the vibration source can be compared. In this way, the output current of a given vibration energy harvester when mounted on a given vibration source could be maximized.

However in general the VEH current output into its load also depends upon the impedance of the load. To complicate further the achievement of a maximum VEH current output, in use the load is usually a capacitor that is progressively charged by the VEH. In the process of charging, the effective impedance of the capacitor changes by a large amount. Hence the current output would also change. Any initial current measurement at installation at a given position would not necessarily indicate that the maximum current would be delivered during operation.

Accordingly, the problem exists that no single load impedance can be used during installation that would properly represent the impedance of the capacitive load when the VEH is in use. Hence it is difficult to predict what the VEH current output would be subsequently when the VEH is in use after having been installed. Consequently, it is difficult to determine a particular mounting position of the VEH on the prospective vibration source which would lead to a maximum current output during subsequent operation.

SUMMARY OF THE INVENTION

The present invention aims to provide a vibration energy harvester, such as an electromechanical generator for example, for converting mechanical vibrational energy into electrical energy, that can solve this problem by providing a vibration energy harvester which is adapted to enable the user to measure the current output during installation and to know that the same current output will be driven into the load when the vibration energy harvester is subsequently in use.

The present invention accordingly provides a vibration energy harvester for converting mechanical vibrational energy into electrical energy, the vibration energy harvester comprising a device for generating electrical energy when subjected to mechanical vibration, and a current control circuit electrically connected to the device for providing a substantially constant output current at an electrical output of the vibration energy harvester.

Preferably, the current control circuit comprises a first controllable variable resistance connected to the electrical output of the vibration energy harvester.

Typically, the first controllable variable resistance comprises a MOSFET or a bipolar junction transistor.

Preferably, the current control circuit is adapted to control the first controllable variable resistance so that an input voltage from the device is maintained at a predetermined voltage.

More preferably, the current control circuit further comprises a reference voltage generator for generating a preset reference voltage, and an error amplifier for comparing an input voltage from the device with the reference voltage for generating a first control signal for selectively adjusting the first controllable variable resistance when the input voltage is different from the reference voltage. Optionally, an additional amplifier may be connected to the output of the error amplifier and the output of the additional amplifier is output to and selectively adjusts the first controllable variable resistance.

In one embodiment, the current control circuit is adapted to control the output voltage at the electrical output of the vibration energy harvester so that the output voltage does not exceed a predetermined threshold voltage.

Preferably, the current control circuit further comprises a second controllable variable resistance connected to the electrical output of the vibration energy harvester, the second controllable variable resistance comprising a shunt resistance between a power line and a ground line of the device.

Typically, the second controllable variable resistance comprises a MOSFET or a bipolar junction transistor.

More preferably, the output of the error amplifier is connected to the second controllable variable resistance, the error amplifier thereby generating a second control signal for selectively adjusting the second controllable variable resistance when the input voltage is different from the reference voltage.

In one embodiment, the current control circuit is integrated with the device. In another embodiment, the current control circuit is in a module which is removably attached to the device.

The present invention further provides a method of operating a vibration energy harvester for converting mechanical vibrational energy into electrical energy, the method comprising the steps of: a. providing on a vibratable support a device for generating electrical energy when subjected to mechanical vibration, and b. using a current control circuit electrically connected to the device for providing a substantially constant output current at an electrical output of the vibration energy harvester when the device is vibrated.

Preferably, the current control circuit controls a first controllable variable resistance connected to the electrical output of the vibration energy harvester so that an input voltage from the device is maintained at a predetermined voltage.

More preferably, the current control circuit compares an input voltage from the device with a reference voltage, and such comparison generates a first control signal for selectively adjusting the first controllable variable resistance when the input voltage is different from the reference voltage.

In one embodiment, the current control circuit controls the output voltage at the electrical output of the vibration energy harvester so that the output voltage does not exceed a predetermined threshold voltage.

More preferably, the current control circuit controls the output voltage at the electrical output of the vibration energy harvester by varying a second controllable variable resistance connected to the electrical output of the vibration energy harvester, the second controllable variable resistance comprising a shunt resistance between a power line and a ground line of the device.

Preferably, the current control circuit compares an input voltage from the device with a second reference voltage, and such comparison generates a second control signal for selectively adjusting the second controllable variable resistance when the input voltage is different from the second reference voltage.

Typically, the method further comprises the step of installing the vibration energy harvester during an installation phase, and in the installing step the output current at the electrical output of the vibration energy harvester is measured when the device is vibrated.

Preferably, the output current is measured using a multimeter.

The present invention further provides a vibration energy harvester for converting mechanical vibrational energy into electrical energy, the vibration energy harvester comprising an electromechanical generator for generating electrical energy when subjected to mechanical vibration, and a current control circuit electrically connected to the device for providing a substantially constant output current at an electrical output of the vibration energy harvester, the current control circuit comprising a first controllable variable resistance connected to the electrical output of the vibration energy harvester, the first controllable variable resistance being selected from the group consisting of a MOSFET and a bipolar junction transistor, a reference voltage generator for generating a preset reference voltage, and an error amplifier for comparing an input voltage from the device with the reference voltage for generating a first control signal for selectively adjusting the first controllable variable resistance when the input voltage is different from the reference voltage.

The present invention is predicated at least partly on the finding by the present inventors that by incorporating a "buffer" circuit at the electrical output of the electromechanical generator, i.e. the vibration energy harvester, so that the "buffer" circuit is, in use, electrically connected between the VEH and its load, such a "buffer" circuit is adapted to cause the electrical output of the VEH to be substantially independent of any changes in the impedance of any load connected thereto in use. The result is a modified vibration energy harvester that is adapted to deliver the same current into a wide range of load impedances and most importantly deliver a constant current into a charging capacitive load.

With such a buffer circuit electrically connected to the VEH, it is possible to measure the current output of the VEH during installation and to know that the same current output would subsequently be driven into any load, irrespective of what load is subsequently selected, when the device is in use.

Even if the load is replaced during the lifetime of the VEH, the current output of the VEH would still be known and the same current output would subsequently be driven into the replacement load.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

Figure 1:
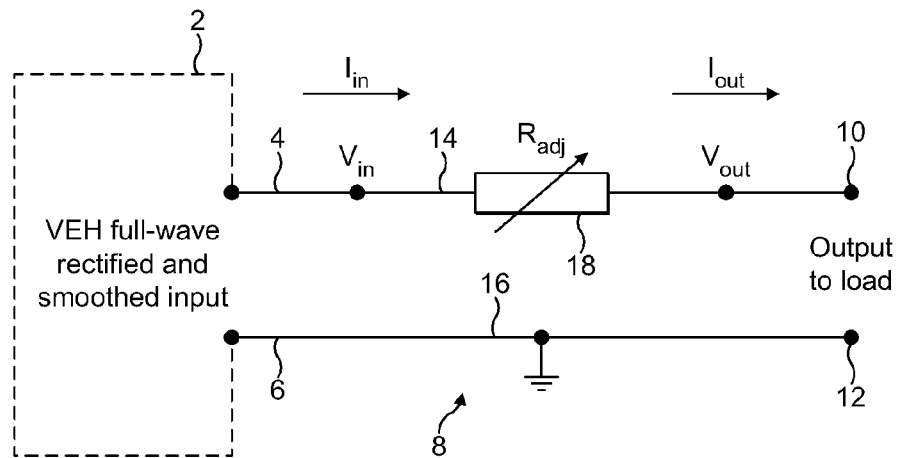
FIG. 1 is a schematic circuit diagram of a current control circuit, including a variable resistance device, connected to the electrical output of an electromechanical generator for converting mechanical vibrational energy into electrical energy in accordance with a first embodiment of the present invention.

Referring to FIG. 1, there is shown schematically an electromechanical generator 2 for converting mechanical vibrational energy into electrical energy in accordance with a first embodiment of the present invention. Such an electromechanical generator is known in the art as a vibration energy harvester. The electromechanical generator 2 may be of a known configuration and in particular may comprise a resonant generator known in the art as a "velocity-damped" resonator where all of the work done by the movement of an inertial mass relative to a housing, which is mounted on the vibrating device, is proportional to the instantaneous velocity of that movement. Inevitably, a portion of that work is absorbed overcoming unwanted mechanical or electrical losses, but the remainder of the work may be used to generate an electrical current via a suitable transduction mechanism, such as the electrical coil/magnetic assembly.

Most typically, the electromechanical generator uses a resonant mass-spring arrangement mounted within a housing. If the electromechanical generator 2 is subject to a source of external vibration, then a magnetic core assembly which comprises an inertial mass moves relative to the housing, and work is done against a damper comprising at least one static electrical coil, the movable magnetic core assembly generating a region of magnetic flux within which the or each electrical coil is disposed. Relative movement of the electrical coil and the magnetic flux causes an electrical current to be induced in the electrical coil which can be used as a source of electrical power for driving an external device (not shown). The coil is connected to a rectifier and associated circuitry to provide that the output electrical power from the electromechanical generator 2, in the form of a full wave rectified and smoothed output, as is well known in the art, is delivered on output lines 4, 6.

Suitable electromechanical generators 2 are known, for example, from the Applicant's earlier published patent specifications, such as WO-A-2007/096615, WO-A-2008/132423 and WO-A-2009/068856.

In accordance with a first embodiment of the present invention, as shown in FIG. 1, an input side of a buffer circuit 8 is connected to one output line 4, as a power line, and to the other output line 6, which is connected to ground. The output side of the buffer circuit 8 is connected to a first output terminal 10 of the modified electromechanical generator 4, and a second output terminal 12, which is connected to ground. The buffer circuit therefore comprises two lines, a power line 14 and a ground line 16.

As shown in FIG. 1, the output lines 4, 6 provide a voltage $V_{in}$ and a current, $I_{in}$ and the output terminals 10, 12 provide a voltage $V_{out}$ and a current, $I_{out}$.

All of FIGS. 1 to 6 have Vin, Vout and GND nodes, which are interchangeable and the circuit of each embodiment may be a three terminal device.

The power line 14 has electrically connected thereon a first controllable variable resistance 18, schematically indicated by $R_{adj}$ in FIG. 1. The controllable variable resistance may comprise a device such as a MOSFET. The resistance $R_{adj}$ is adapted to be varied by the buffer circuit 8 in order to keep $V_{in}$ at a constant voltage biasing point. In other words, the resistance $R_{adj}$ is adjusted automatically so that the input voltage $V_{in}$ is maintained at a constant value. It is a property of the electromechanical generator VEH that for a particular vibration magnitude and vibration frequency and a constant output voltage (which is achieved when this is controlled to equal $V_{in}$), the VEH delivers a constant power (which is IV) and therefore delivers a constant current, $I_{in}$. As $I_{out}$ equals $I_{in}$ (except for a negligible leakage shunt current within the controllable variable resistance 18) the buffer circuit 8 has a constant output current into its load irrespective of $V_{out}$, so long as $V_{out}$ is not more than $V_{in}$.

If a multimeter (not shown), for selectively measuring current and voltage, is attached to the output terminals 10, 12 during installation of the VEH, the multimeter can be used accurately to measure the output current $I_{out}$ even though the impedance of the multimeter is completely different from the load, for example a storage capacitor, that would be electrically connected to the output terminals 10, 12, and powered electrically by the VEH, during eventual use of the VEH in the field. In this way, the current output in use can be accurately predicted during installation of the VEH.

Figure 2:
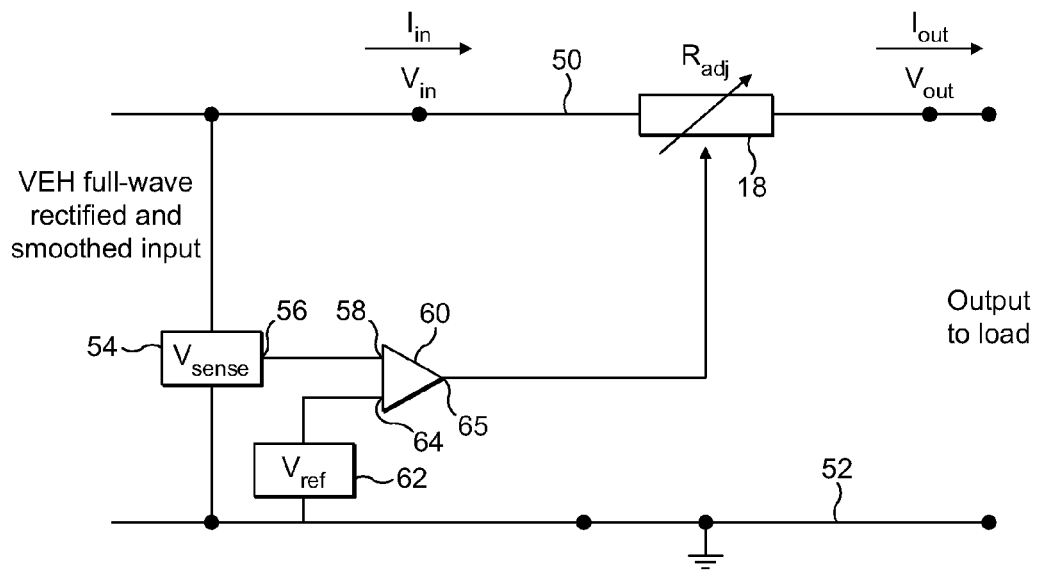
FIG. 2 is a schematic circuit diagram of an embodiment of variable resistance device for use in of the current control circuit of FIG. 1.

FIG. 2 is a schematic circuit diagram of an embodiment of variable resistance device for use in of the current control circuit of FIG. 1. In other words, the first controllable variable resistance 18, to provide $R_{adj}$, which is schematically illustrated by a respective block in FIG. 1, is incorporated into the circuit diagram of FIG. 2 which illustrates the control circuitry for controlling the variable resistance.

Referring to FIG. 2, the first controllable variable resistance 18 is provided in a respective power line 50 between $V_{in}$ and $V_{out}$, there also being a ground line 52. These lines may be the same as the power line 4 and ground line 6. A voltage sensor 54 is connected between the power line 50 and the ground line 52. An output 56 of the voltage sensor 54 is connected to a first input 58 of an error amplifier 60. A reference voltage generator 62 is connected between ground line 52 and a second input 64 of the error amplifier 60. The error amplifier 60 has an output 65 which comprises a first control signal which is an amplification of any difference between the sensed voltage and the reference, and thus which constitutes an error between the actual input voltage $V_{in}$ and the reference voltage $V_{ref}$. The control signal on output 65 is directed to the first controllable variable resistance 18 to control the resistance value $R_{adj}$.

Figure 3:
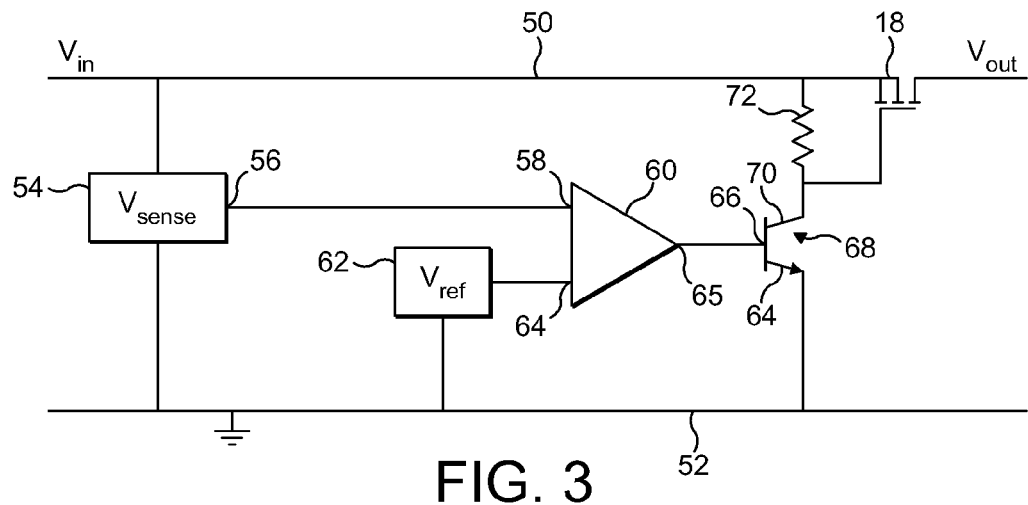
FIG. 3 is a particular example of a current control circuit of FIG. 2.

Referring to the specific circuitry of FIG. 3, the output 65 of error amplifier 60 is connected to a base 66 of a transistor 68, the transistor 68 constituting an amplifier. The collector 70 of the transistor 68 is connected to the first controllable variable resistance 18 and additionally the power line 50 via a resistance 72. The emitter 74 of the transistor 68 is connected to the ground line 52. The output voltage of the collector 70 constitutes a first control signal which selectively controls the first controllable variable resistance 18, thereby to control the resistance value $R_{adj}$.

The error amplifier 60, and the amplifier constituted by transistor 68, act to compare the input voltage $V_{in}$, which has been sensed by the voltage sensor 54 to provide a sensed voltage value $V_{sense}$, with a reference voltage $V_{ref}$ generated by the reference voltage generator 62 and any difference between the $V_{sense}$ value, corresponding to the $V_{in}$ value, and the $V_{ref}$ value is amplified by the error amplifier 60 which operates the transistor 68 to control the variable resistance 18.

Any difference between the $V_{sense}$ value, corresponding to the $V_{in}$ value, and the $V_{ref}$ value is amplified and the resultant high output signal on output 65 causes transistor 68 to be switched on to cause current flow therethrough. This causes a high signal at the base of the MOSFET 18 comprising the first variable resistance 18, which lowers its resistance to current flow along power line 50.

The error amplifier 60, and the amplifier constituted by transistor 68, thereby control the variable resistance 18, having the resistance value $R_{adj}$, so that the voltage value $V_{in}$ is maintained to keep $V_{in}$ at a constant voltage biasing point, determined by the reference voltage $V_{ref}$, as discussed hereinabove with respect to FIG. 1. The control circuit operates automatically to maintain the voltage value $V_{in}$ substantially at the reference voltage $V_{ref}$.

In the first embodiment, in general, there only needs to be an error amplifier driving Radj; there is no need to actually have two amplifiers if the error amplifier has a sufficient gain to generate the required control signal for directly controlling the variable resistance 18. Therefore in a modification of the embodiment the amplifier 68 may be omitted.

Figure 7:
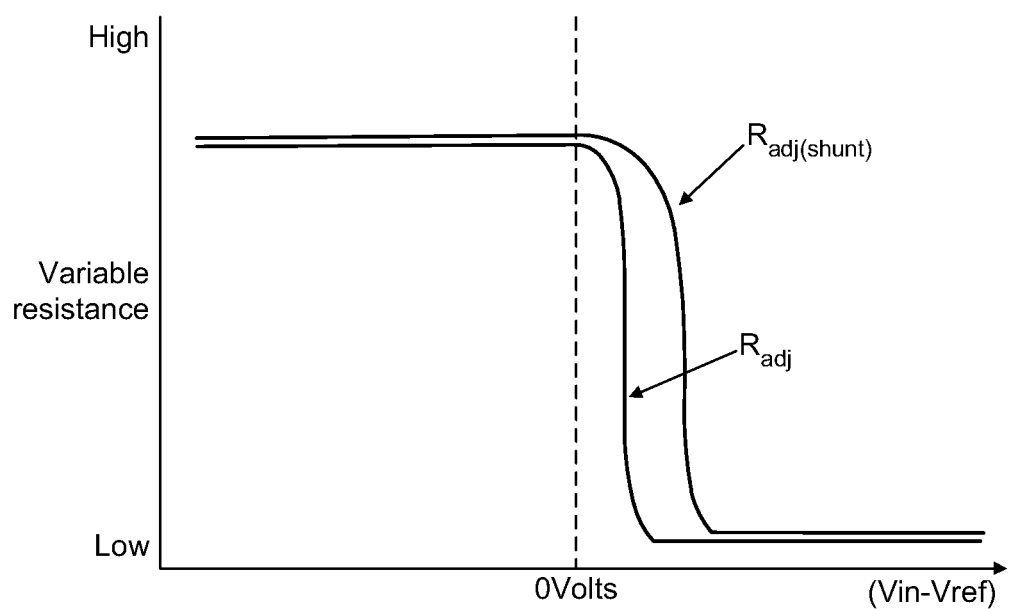
FIG. 7 is a graph showing the relationship between the values of the first or second variable resistance with respect to voltage, and showing how the resistance value is reduced by operation of the control circuit which compares the input voltage Vin against a reference voltage Vref.

Referring to FIG. 7, the error amplifier 60 compares the input voltage $V_{in}$, which has been sensed by the voltage sensor 54 to provide a sensed voltage value $V_{sense}$, with a reference voltage $V_{ref}$ generated by the reference voltage generator 62. When the $V_{sense}$ value, corresponding to the $V_{in}$ value, is greater than the $V_{ref}$ value, the output signal from the error amplifier controls the variable resistance 18 and in particular causes the resistance value resistance value $R_{adj}$ to be switched from a high level to a low level when there is a positive difference between the input voltage $V_{in}$ and the reference voltage $V_{ref}$. Accordingly, $R_{adj}$ is controlled by an amplifier which compares $V_{in}$ to a reference voltage which creates the voltage biasing point.

It should be noted that the power for the reference voltage generator 62 and the transistor 68, constituting the amplifier, is drawn between $V_{in}$ and ground. In a typical embodiment, the current required to perform these functions represents a small, and typically insignificant, fraction of $I_{in}$.

Figure 4:
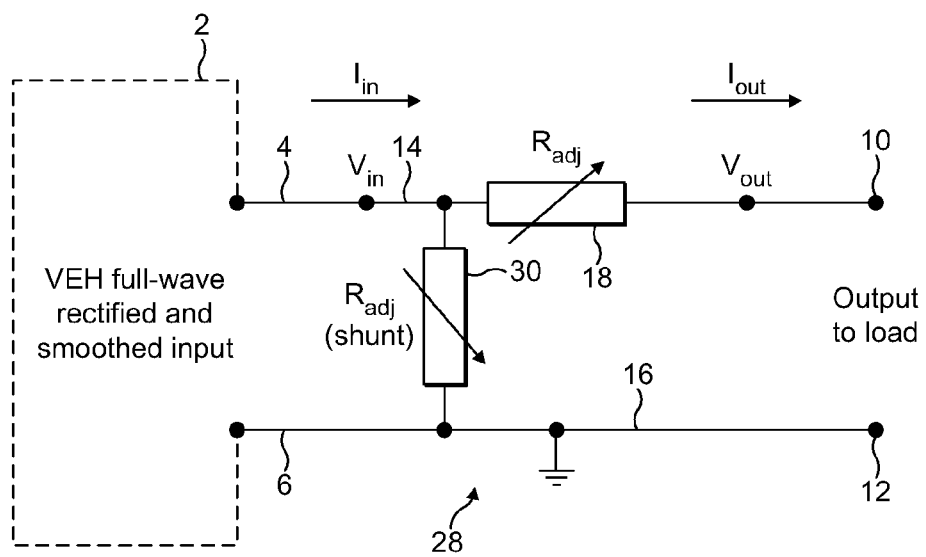
FIG. 4 is a schematic circuit diagram of a current control circuit, including two variable resistance devices, connected to the electrical output of an electromechanical generator for converting mechanical vibrational energy into electrical energy in accordance with a second embodiment of the present invention.

In accordance with a second embodiment of the present invention, as shown in FIG. 4, a modified buffer circuit 28 is provided which is adapted additionally to control the output voltage with the result that the maximum output voltage $V_{out}$ at the terminals 10, 12 does not exceed a maximum threshold.

This modification is provided, for example, when it is known or intended that in the device to be electrically powered by the VEH the load storage capacitor has a maximum operating voltage. As compared to the first embodiment, like parts are identified by like reference numerals.

The modification comprises additionally providing in the buffer circuit 28 a second controllable variable resistance 30, schematically indicated by $R_{adj(shunt)}$ in FIG. 4, which is connected as a shunt resistance between the output lines 4, 6, and so is connected to the input side of the controllable variable resistance 18, having the resistance $R_{adj}$. Again, the second controllable variable resistance 30 may comprise a device such as a MOSFET or a bipolar junction transistor (BJT), the latter being shown in the example of FIG. 6.

In this buffer circuit 28, during normal operation during which $V_{out}$ is less than $V_{in}$, the resistance $R_{adj(shunt)}$ is controlled so as to be maintained at a very high resistance while $R_{adj}$ is adjusted to maintain $V_{in}$ at its biasing voltage determined by the reference voltage, as discussed above. This renders negligible or absent any shunt current between the output lines 4, 6.

However, if $V_{out}$ rises up to become equal to $V_{in}$, $R_{adj(shunt)}$ during normal operation being at a very high resistance, then $R_{adj(shunt)}$ is lowered in order to shunt some of the current $I_{in}$ to ground. In this way $V_{out}$ is prevented from exceeding the biasing voltage $V_{in}$. The voltage applied to the load is therefore limited to the biasing voltage which accordingly limits the load to being subjected to a selected maximum threshold voltage.

Figure 5:
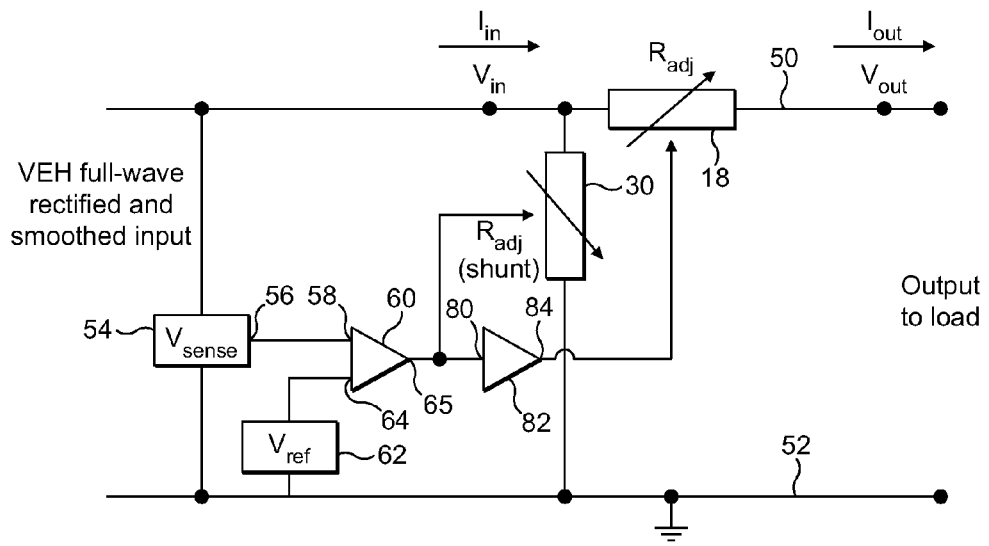
FIG. 5 is a schematic circuit diagram of an embodiment of variable resistance device for use in of the current control circuit of FIG. 4.

FIG. 5 is a schematic circuit diagram of a further embodiment of variable resistance device for use in of the current control circuit of FIG. 4. In other words, each of the first controllable variable resistance 18, to provide $R_{adj}$, and the second controllable variable resistance 30, to provide $R_{adj(shunt)}$, which are schematically illustrated by a respective block in FIG. 4, are incorporated into the circuit diagram of FIG. 5 which illustrates the control circuitry for controlling the respective variable resistance.

Referring to FIG. 5, the first controllable variable resistance 18 is provided in the respective power line 50 between $V_{in}$ and $V_{out}$, there also being the ground line 52. These lines may be the same as the power line 14 and ground line 16. The second controllable variable resistance 30 is provided as a shunt between the power line 50 and the ground line 52. A voltage sensor 54 is connected between the power line 50 and the ground line 52. An output 56 of the voltage sensor 54 is connected to a first input 58 of an error amplifier 60. A reference voltage generator 62 is connected between ground line 52 and a second input 64 of the error amplifier 60. The error amplifier 60 has an output 65 connected to two elements. The first element is the second controllable variable resistance 30, which may be a MOSFET or a BJT as described above for the first controllable variable resistance 18 of the previous embodiment. The second element is an input 80 of an amplifier 82, and as for the first embodiment the output 84 of the amplifier 82 is connected to the first controllable variable resistance 18, which again may be a MOSFET or a BJT as described above. The output of the error amplifier 60, amplified by the amplifier 82, constitutes a first control signal which selectively controls the first controllable variable resistance 18, thereby to control the resistance value $R_{adj}$ and the output of the error amplifier 60 also constitutes a second control signal which selectively controls the second controllable variable resistance 30, thereby respectively to control the resistance value $R_{adj(shunt)}$.

Figure 6:
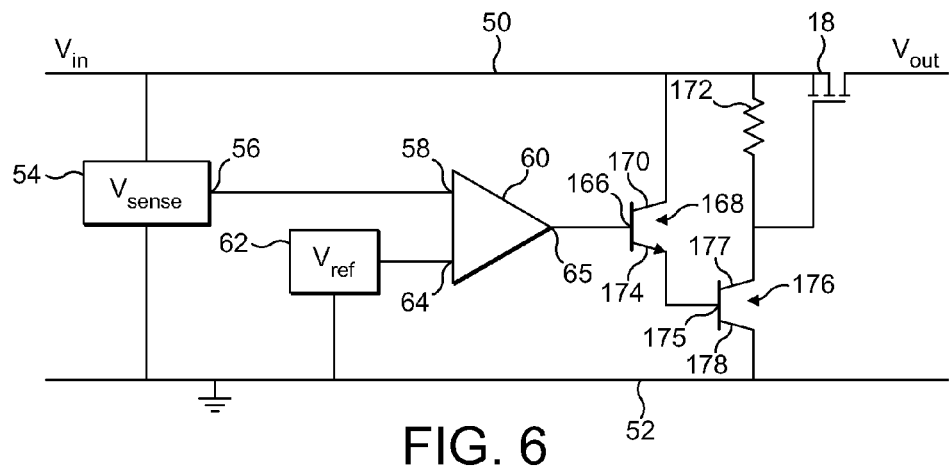
FIG. 6 is a particular example of a current control circuit of FIG. 5.

Referring to the specific circuitry of FIG. 6, the output 65 of error amplifier 60 is connected to a base 166 of a first transistor 168. The collector 170 of the first transistor 168 is connected to the power line 50. The emitter 174 of the first transistor 168 is connected to the base 175 of a second transistor 176. The collector 177 of the second transistor 176 is connected to the first controllable variable resistance 18 and additionally the power line 50 via a resistance 172. The output voltage of the collector 177 constitutes a second control signal which selectively controls the first controllable variable resistance 18, thereby to control the resistance value $R_{adj}$. The emitter 178 of the transistor 168 is connected to the ground line 52.

The error amplifier 60 compares the input voltage $V_{in}$, which has been sensed by the voltage sensor 54 to provide a sensed voltage value $V_{sense}$, with a reference voltage $V_{ref}$ generated by the reference voltage generator 62. Any difference between the $V_{sense}$ value, corresponding to the $V_{in}$ value, and the $V_{ref}$ value is amplified and the resultant high output signal on output 65 causes transistor 168 to be switched on to cause current flow therethrough (the transistor 168 being configured to provide only a relatively small current flow therethrough). This in turn provides a high input at base 175 of transistor 176 which causes transistor 176 to be switched on to cause current flow therethrough (the transistor 176 being configured to provide a relatively high current flow therethrough as compared to transistor 168). This causes a high signal at the base of the MOSFET 18 comprising the first variable resistance 18, which lowers its resistance to current flow along power line 50. This also causes a current to flow from power line 50, through resistor 172, through transistor 176 and to the ground line 52, which acts as a low resistance shunt. In this way, both the first variable resistance 18 and the variable resistance 30 are controlled, and lowered, by common circuitry.

The transistors 168, 176 control the variable resistance 18, having the resistance value $R_{adj}$, so that the voltage value $V_{in}$ is maintained to keep $V_{in}$ at a constant voltage biasing point, as discussed hereinabove with respect to FIG. 4.

Accordingly, $R_{adj}$ and $R_{adj(shunt)}$ are controlled by a common error amplifier which compares $V_{in}$ to a reference voltage which creates the voltage biasing point, and that voltage biasing point is employed to control both resistances by dropping them to a low level from a high level when there is a positive voltage difference between voltage value $V_{in}$ and reference voltage value $V_{ref}$.

Referring again to FIG. 7, the error amplifier 60 compares the input voltage $V_{in}$, which has been sensed by the voltage sensor 54 to provide a sensed voltage value $V_{sense}$, with a reference voltage $V_{ref}$ generated by the reference voltage generator 62. When the $V_{sense}$ value, corresponding to the $V_{in}$ value, is greater than the $V_{ref}$ value, the output signal from the error amplifier controls the variable resistance 18, 30 and in particular causes the resistance value resistance values $R_{adj}$ and $R_{adj(shunt)}$ to be switched from a high level to a low level. The resistance value $R_{adj(shunt)}$ is reduced only after reduction of the resistance value $R_{adj}$ in order to minimise current loss caused by the current shunting through $R_{adj(shunt)}$.

Accordingly, when the voltage value $V_{in}$ rises and exceeds a threshold value, the resistance value $R_{adj(shunt)}$ is lowered thereby to shunt current therethrough so as to keep the voltage value $V_{out}$ at or below the threshold value, as discussed hereinabove with respect to FIG. 4.

Accordingly, $R_{adj}$ and $R_{adj(shunt)}$ are controlled by a common voltage and error amplifier circuitry which compare $V_{in}$ to a reference voltage which creates the voltage biasing point for each controllable resistance. This is an inexpensive and straightforward electrical solution to controlling the two resistances by using a common reference voltage.

It should be noted from FIG. 7 that the first controllable resistance 18, $R_{adj}$, is lowered more rapidly than the second controllable resistance 30, $R_{adj(shunt)}$, so that very little current is shunted to ground before the first controllable resistance $R_{adj}$ has dropped to near its lowest level.

The preferred embodiments therefore provide a reliable and simple buffer circuit which is adapted to control the output of a vibration energy harvester to provide a constant current output. The buffer circuit may be integrated into vibration energy harvester, for example into the voltage control and rectification circuitry conventionally employed in such vibration energy harvesters. Alternatively, the buffer circuit may be provided in a separate module adapted for electrical connection to the voltage control and rectification circuitry of such a vibration energy harvesters. The resultant structure of either mode of implementation may be robust, durable and compact.

The provision of such a buffer circuit makes it possible to measure the current output of the VEH during installation and to know that the same current output would subsequently be driven into any load, irrespective of what load is subsequently selected, when the device is in use. Furthermore, even if the load is replaced during the lifetime of the VEH, the current output of the VEH would still be known and the same current output would subsequently be driven into the replacement load. The same current would flow into any load so long as driving that current did not require a voltage greater than the voltage biasing point to which Vin is "clamped."

Other modifications and embodiments of the present invention will be apparent to those skilled in the art.

What is claimed is:

1. A vibration energy harvester for converting mechanical vibrational energy into electrical energy, the vibration energy harvester comprising:
    a device for generating electrical energy when subjected to mechanical vibration; and
    a current control circuit electrically connected to the device for providing a substantially constant output current at an electrical output of the vibration energy harvester, the current control circuit having:
        a first controllable variable resistance connected to the electrical output of the vibration energy harvester, the current control circuit adapted to control the first controllable variable resistance to maintain a predetermined input voltage and adapted to control a device output voltage at the electrical output of the vibration energy harvester so that the output voltage does not exceed a predetermined threshold voltage,
        a second controllable variable resistance connected to the electrical output of the vibration energy harvester, the second controllable variable resistance comprising a shunt resistance between a power line and a ground line of the device, and
        a reference voltage generator for generating a preset reference voltage, and an error amplifier for comparing the input voltage from the device with the reference voltage for generating a first control signal for selectively adjusting the first-controllable variable resistance when the input voltage is different from the reference voltage.

2. A vibration energy harvester according to claim 1 wherein the first controllable variable resistance comprises a MOSFET or a bipolar junction transistor.

3. A vibration energy harvester according to claim 1 wherein the second controllable variable resistance comprises a MOSFET or a bipolar junction transistor.

4. A vibration energy harvester according to claim 1 wherein the output of the error amplifier is connected to the second controllable variable resistance, the error amplifier thereby generating a second control signal for selectively adjusting the second controllable variable resistance when the input voltage is different from the reference voltage.

5. A vibration energy harvester according to claim 1 wherein the current control circuit is integrated with the device.

6. A vibration energy harvester according to claim 1 wherein the current control circuit is in a module which is removably attached to the device.

7. A method of operating a vibration energy harvester for converting mechanical vibrational energy into electrical energy, the method comprising the steps of:
    a. providing on a vibratable support a device for generating electrical energy when subjected to mechanical vibration; and
    b. using a current control circuit electrically connected to the device to perform the steps of:
    providing a substantially constant output current at an electrical output of the vibration energy harvester when the device is vibrated,
    controlling a first controllable variable resistance connected to the electrical output of the vibration energy harvester so that an input voltage from the device is maintained at a predetermined voltage,
    comparing the input voltage from the device with a reference voltage, and such comparison generates a first control signal for selectively adjusting the first controllable variable resistance when the input voltage is different from the reference voltage; and
    controlling an output voltage at the electrical output of the vibration energy harvester so that the output voltage does not exceed a predetermined threshold voltage by varying a second controllable variable resistance connected to the electrical output of the vibration energy harvester;
    wherein the second controllable variable resistance comprises a shunt resistance between a power line and a ground line of the device.

8. A method according to claim 7 wherein the current control circuit compares an input voltage from the device with the reference voltage, and such comparison generates a second control signal for selectively adjusting the second controllable variable resistance when the input voltage is different from the reference voltage.

9. A method according to claim 7 further comprising the step of installing the vibration energy harvester during an installation phase, and in the installing step the output current at the electrical output of the vibration energy harvester is measured when the device is vibrated.

10. A method according to claim 9 wherein the output current is measured using a multimeter.

11. A vibration energy harvester for converting mechanical vibrational energy into electrical energy, the vibration energy harvester comprising:
    an electromechanical generator for generating electrical energy when subjected to mechanical vibration, and
    a current control circuit electrically connected to the device for providing a substantially constant output current at an electrical output of the vibration energy harvester, the current control circuit comprising:
        a first controllable variable resistance connected to the electrical output of the vibration energy harvester, the first controllable variable resistance being selected from the group consisting of a MOSFET and a bipolar junction transistor, a reference voltage generator for generating a preset reference voltage, and an error amplifier for comparing an input voltage from the device with the reference voltage for generating a first control signal for selectively adjusting the first controllable variable resistance when the input voltage is different from the reference voltage, and a second controllable variable resistance connected to the electrical output of the vibration energy harvester, the second controllable variable resistance comprising a shunt resistance between a power line and a ground line of the device;

wherein the current control circuit is adapted to control the first controllable variable resistance to maintain a predetermined input voltage and adapted to control a device output voltage at the electrical output of the vibration energy harvester so that the output voltage does not exceed a predetermined threshold voltage.

* * * * *